United States Patent
Wong et al.

(10) Patent No.: US 7,408,420 B2
(45) Date of Patent: Aug. 5, 2008

(54) MULTI MODE CLOCK GENERATOR

(75) Inventors: Keng L. Wong, Portland, OR (US);
Feng Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/237,268

(22) Filed: Sep. 27, 2005

(65) Prior Publication Data

US 2007/0069825 A1    Mar. 29, 2007

(51) Int. Cl.
*H03L 7/00* (2006.01)
(52) U.S. Cl. .................. 331/49; 331/177 R; 331/34
(58) Field of Classification Search .............. 331/49, 331/2, 34, 55, 177 R, 46, 56, 143, 156, 157; 327/156
See application file for complete search history.

(56) References Cited

U.S. PATENT DOCUMENTS

| | | | |
|---|---|---|---|
| 3,708,686 A | * | 1/1973 | Butler et al. ............... 307/149 |
| 3,931,588 A | * | 1/1976 | Gehweiler .................. 331/57 |
| 4,485,818 A | * | 12/1984 | Leckrone et al. ............. 607/9 |
| 5,059,818 A | * | 10/1991 | Witt et al. .................. 327/175 |
| 5,142,247 A | * | 8/1992 | Lada et al. ................... 331/14 |
| 5,196,810 A | * | 3/1993 | Graether et al. .............. 331/49 |
| 6,771,134 B2 | | 8/2004 | Wong |
| 6,885,233 B2 | | 4/2005 | Huard |
| 6,934,872 B2 | | 8/2005 | Wong |
| 6,985,041 B2 | | 1/2006 | Wong |
| 7,013,406 B2 | | 3/2006 | Naveh |
| 2004/0080347 A1 | * | 4/2004 | Wong et al. ................. 327/143 |
| 2004/0177132 A1 | * | 9/2004 | Zhang et al. ................ 709/220 |

* cited by examiner

*Primary Examiner*—Benny Lee
*Assistant Examiner*—Ryan J Johnson
(74) *Attorney, Agent, or Firm*—Erik R. Nordstrom

(57) ABSTRACT

In some embodiments, a clock generator is provided that provides a generator clock. The clock generator comprises a first clock source to provide a first clock and a second clock source to provide a second clock whose frequency at least indirectly tracks a supply to a clock distribution network. The clock generator selectably provides as the generator clock the first clock when the second clock leads the first clock and the second clock when it lags behind the first clock. Other embodiments are claimed and disclosed herein.

20 Claims, 3 Drawing Sheets

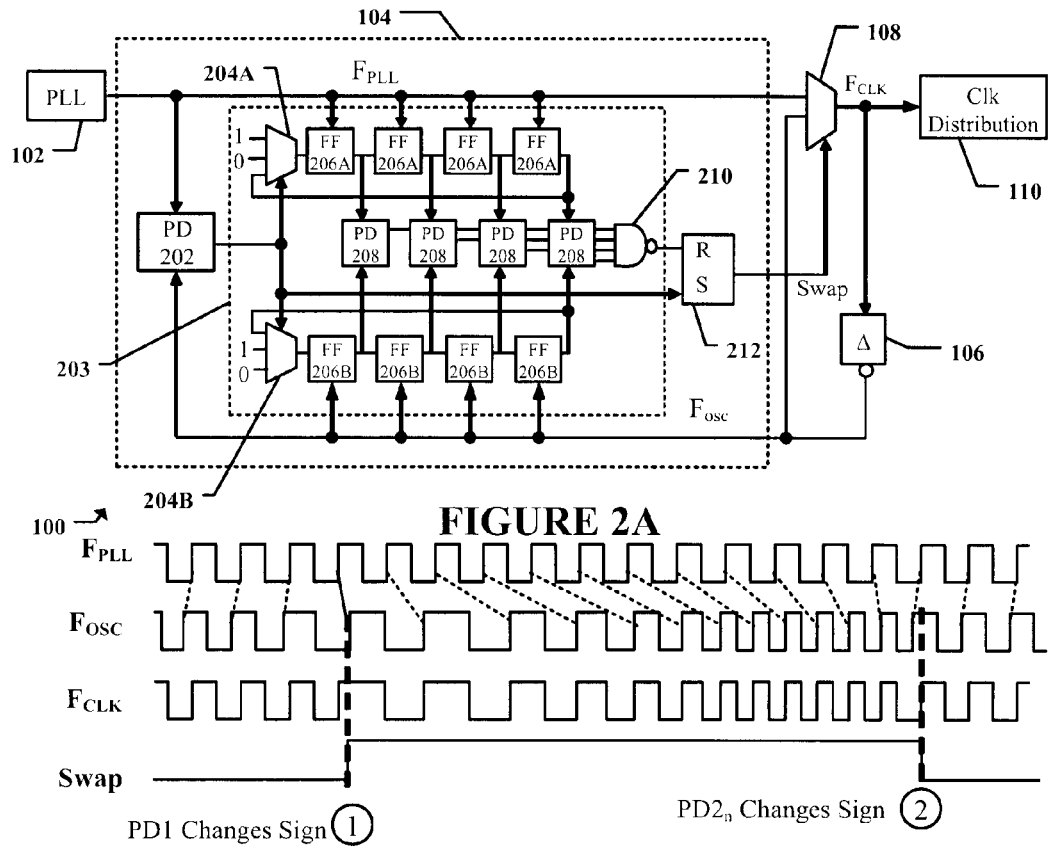
FIGURE 2A
FIGURE 2B
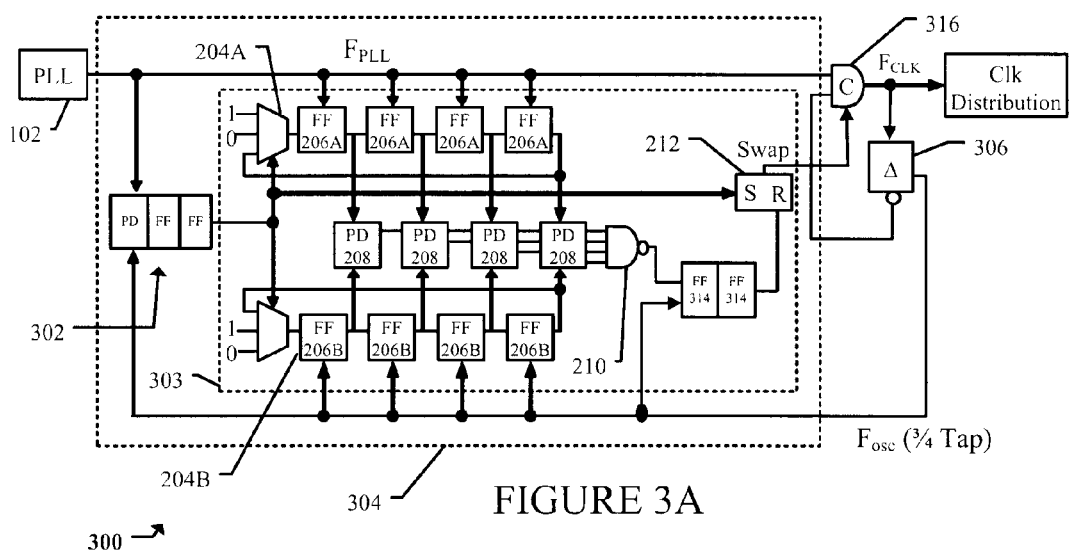
FIGURE 3A

US 7,408,420 B2

MULTI MODE CLOCK GENERATOR

BACKGROUND

In modern integrated circuits (ICs) such as microprocessors, it is getting ever more difficult to constrain power supply noise due to among other things circuit switching. For example clock gating is a popular approach to control average power consumption. Unfortunately, however, when large sections of a device are switched on or off, a large current change may be incurred thereby provoking a response (e.g., voltage droop) in the power supply network. While circuits driven by clock distribution networks become less capable of operating at higher frequencies during such droops, clock generators such as phase locked loop (PLL) frequency generators may be designed to continue operating at their target frequencies. To redress this incongruity, some traditional solutions involve operating the clock generator at an overall reduced target frequency so that clock driven circuits can suitably operate during such droops. A novel approach may be desired.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2A is a schematic diagram of a clock generator system suitable for use in the system of FIG. 1 according to some embodiments.

FIG. 2B is a timing diagram showing operation of the system of FIG. 2B according to some embodiments.

FIG. 3A is a schematic diagram of another embodiment of a clock generator system.

DETAILED DESCRIPTION

Clock generators typically use phase locked loop (PLL) frequency synthesizers to produce a robust, constant frequency source that is resilient to power supply spikes and noise. Unfortunately, with a large supply droop, circuitry (such as a microprocessor core) can be impaired and not be able to properly operate at otherwise normal frequency levels. Thus, during a supply droop, such circuitry may not be able to operate at the frequency generated by the PLL. With some embodiments disclosed herein, during a power supply droop event, the clock generator source may be switched from a PLL generator to an auxiliary oscillator whose frequency tracks the power supply level and thus decreases with the supply droop.

Figure 1A:
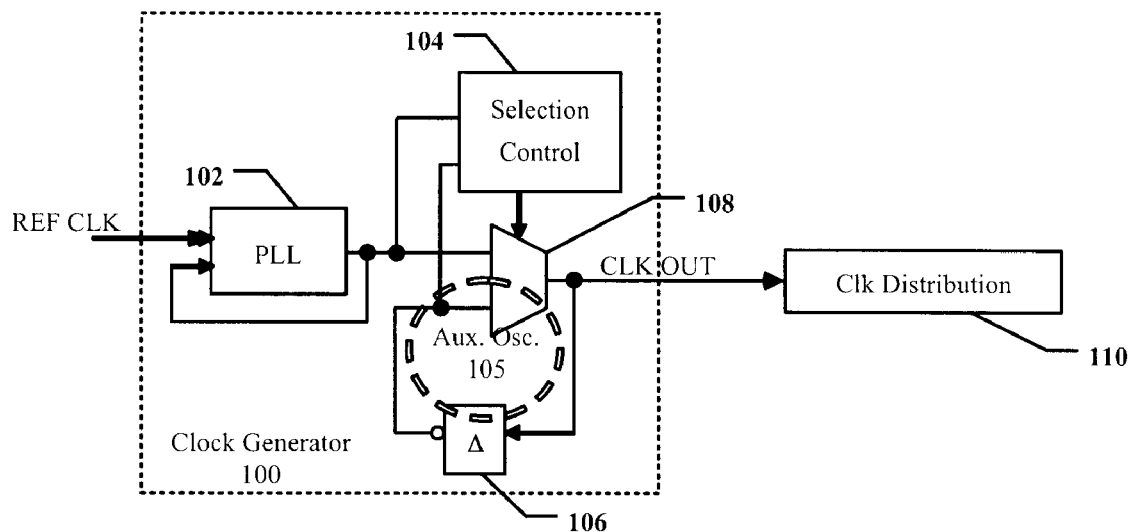
FIG. 1A is a block diagram of a novel clock generator system according to some embodiments.
Figure 1B:
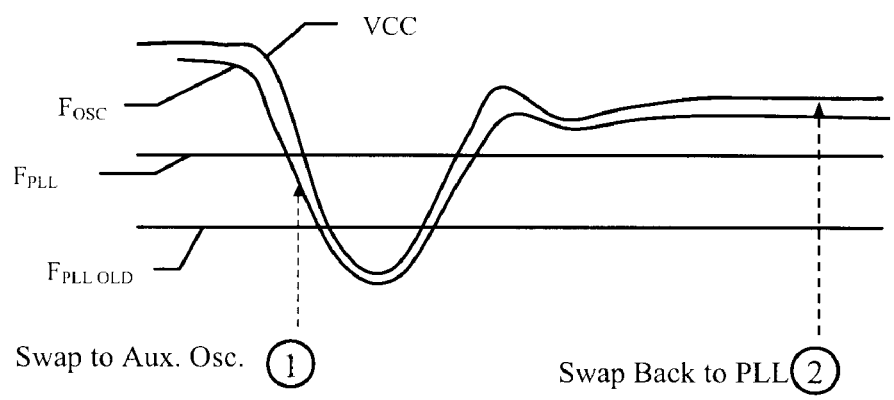
FIG. 1B is a graph showing operating supply levels and clock generator source frequencies for the system of FIG. 1A according to some embodiments.

With reference to FIGS. 1A and 1B, a clock generator 100 coupled to a clock distribution network 110 to provide it with a generator clock (CLK OUT) is shown. The clock generator 100 generally comprises a first clock source (PLL 102), a selection control circuit 104, a second clock source (auxiliary oscillator 105 formed from a delay line 106) and a multiplexer (mux) 108 coupled together as indicated. The clock generator 100 receives at its input a reference clock signal (REF CLK) used by the PLL 102 and generates at its output a generator clock (CLK OUT).

As shown in FIG. 1B, the PLL generates a substantially constant frequency ($F_{PLL}$), which may be higher than it otherwise could be (e.g., $F_{PLL\_OLD}$) if the alternate, second clock source was not available during a supply level droop. The frequency ($F_{OSC}$) of the second clock source (auxiliary oscillator 105) substantially tracks the level of the supply. Thus, when $F_{OSC}$ falls below the PLL frequency (indicating that the supply has drooped), the auxiliary oscillator 105 is swapped in place of the PLL as the clock source for the clock generator 100. Conversely, when the auxiliary oscillator frequency ($F_{OSC}$) rises back above the PLL frequency, the PLL is switched back as the clock generator source.

The depicted multiplexer 108 is a 2:1 multiplexer with an output, first and second inputs, and a control input coupled to the selection control circuit 104 to select either the first or second input to be coupled to the multiplexer output. The PLL 102 is coupled to one of the multiplexer inputs. The other multiplexer input is coupled to an output of the delay line 106. The input of the delay line 106 is coupled to the clock generator output, which is at the output of the multiplexer 108. Besides being coupled to the control input of the multiplexer 108, the selection control circuit is also coupled to the output of the PLL 102 and to the output of the delay line 106 to monitor their clocks ($F_{PLL}$ and $F_{OSC}$).

The PLL 102 may be implemented with any suitable PLL circuit to generate a PLL output clock that is tracked to the input reference clock. In some embodiments, it produces a clock signal that is reasonably immune to noise from its power supply. Similarly, the delay line 106 may be implemented with any suitable circuit. In the depicted embodiment, it comprises an odd number of cascaded stages to provide a suitable delay (e.g., ½ or 1½ cycle) for generating a clock that leads the PLL output clock under normal operating conditions. The delay line 106 is powered by a supply (e.g., supply voltage) that powers one or more relevant circuits in the clock distribution network 110. In this way, it provides delay that is inversely proportional to the supply level of the relevant circuitry in the clock distribution network or microprocessor core. It may be tuneable (e.g., via fuse trimming) to produce a delayed version of the PLL output (when the PLL is selected at the multiplexer) so that it suitably leads the PLL output clock. As the supply level decreases, the amount of delay increases, which causes its frequency ($F_{OSC}$) to eventually lag behind the PLL frequency if the supply droops far enough. This is generally depicted in FIG. 1B and more particularly in FIG. 2B (discussed below).

In operation, the selection control circuit 104 monitors the frequencies generated at the outputs of the PLL and delay line to determine which is leading. The delay line 106 is configured so that under normal operation, it leads the PLL signal frequency. During this time, it controls the multiplexer to select the PLL as the source for the clock generator to provide the clock output (CLK OUT) signal.

If a supply droop occurs, the frequency out of the delay line ($F_{OSC}$) decreases. If the supply droops far enough, it eventually starts to lag the PLL frequency. The selection control circuit 104 detects this and causes the delay line output to be selected at the multiplexer 108 instead of the PLL. When this happens, the input of the delay line 106 is coupled to its output thereby closing the loop and forming a ring oscillator, which generates a clock at the clock generator output. The generated frequency ($F_{OSC}$) will generally track the supply level, so it provides a clock that the relevant clock distribution and microprocessor core circuitry can handle.

With reference to FIGS. 2A and 2B, a more detailed implementation of the clock generator 100 and in particular, the selection control circuit 104, in accordance with some embodiments, is shown. The selection control circuit 104 generally comprises a first phase detector 202, a second phase detector 203, and an R/S latch 212. The output of the first phase detector 202 is coupled to the Set input of the R/S latch 212, while the output of the second phase detector 203 is coupled to the Reset input of the latch. The output of the R/S latch in turn is coupled to the control input of the multiplexer 108 to select either the PLL or auxiliary oscillator (delay line 106) for passing to the clock generator output. (Note, that the terms delay line and aux. oscillator may be used interchangeably for convenience, although it is recognized that the delay line does not form an oscillator in this embodiment until its output is coupled to its input via the multiplexer.)

The first phase detector 202 detects when the auxiliary oscillator frequency ($F_{OSC}$) crosses below the PLL frequency ($F_{PLL}$). When this happens, it sets the R/S latch thereby controlling the multiplexer 108 to select the delay line 106 instead of the PLL, which causes the auxiliary oscillator 105 to be established and provide the clock generator output clock. The second phase detector 203 detects when the auxiliary oscillator frequency crosses back above the PLL frequency. When this happens, it resets the R/S latch 212 thereby controlling the multiplexer 108 to once again select the PLL for the clock generator output.

The first phase detector may be implemented with any suitable circuit for detecting a phase and/or frequency difference between the PLL and auxiliary oscillator signals. In the depicted embodiment, phase detector 202 is implemented with a flip-flop (e.g., D flip-flop) type detector. During each cycle, it asserts if the PLL edge arrives first and de-asserts if the auxiliary oscillator edge arrives first. Thus, as indicated in FIG. 2B, under normal operating conditions ("Swap" is de-asserted and $F_{OSC}$ is above $F_{PLL}$), the delay line edge arrives at phase detector 202 first thereby maintaining the R/S latch 210 output de-asserted to select the PLL as the clock generator source. However, when $F_{OSC}$ falls behind $F_{PLL}$, phase detector 202 asserts thereby setting the R/S latch 210 causing it to select the delay line (auxiliary oscillator) as the clock source instead of the PLL. This is indicated in FIG. 2B where the Swap signal transitions from Low to High. The assertion of the first phase detector 202 also activates the circular phase detector 203 to begin tracking for the cross-back point when the power supply recovers from its droop and the accumulated phase of $F_{OSC}$ is realigned with that of $F_{PLL}$.

The second phase detector 203 may comprise any suitable circuit for detecting when the auxiliary oscillator's accumulated phase crosses (e.g., back above) the PLL's accumulated phase. It is desirable to swap the clocks at the correct moment for a seamless, glitch-free operation. In the depicted embodiment, a circular phase detector capable of detecting such a change over multiple cycles once it is activated is used. The circular phase detector 203 generally comprises multiplexers 204A/B, flip-flops 206A/B, phase detectors (such as the type used for the first phase detector) 208, and NAND gate 210, coupled together as indicated. It is divided into first and second ("A" and "B") sections, each being formed from a multiplexer 204A/B coupled to one or more cascaded together flip-flop stages 206A/B, whose output is coupled back to the multiplexer. Fixed "1" and "0" inputs are applied at inputs of the multiplexer 204A/B. The outputs from each flip-flop stage 206A/B are also coupled to an associated phase detector 208, and the output from each phase detector 208 is coupled to an input of the NAND gate 210, whose output is coupled to the reset input of the R/S latch 212.

The first circular section ("A" section) tracks the PLL clock ($F_{PLL}$), while the second section (B section) tracks the auxiliary oscillator clock ($F_{OSC}$). Initially, e.g., at start-up, the flip-flop chains 206A/B are reset to a de-asserted ("0") state, and the phase detector 208 outputs are asserted, which causes the NAND gate 210 to de-assert. Under normal operating conditions (i.e., when the PLL sources the clock generator output and $F_{PLL}$ is above $F_{OSC}$), the "0" input at each multiplexer 204A/B is selected so that a "0" circulates through each section. However, when the first phase detector 202 asserts (upon the auxiliary oscillator frequency crossing below the PLL frequency), it causes the multiplexers 204A/B to select the "1" input. This causes a one-cycle wide token ("1") to be passed through each flip-flop chain. In essence, a "token" race between the first and second chains is thereby created. The phases of $F_{OSC}$ and $F_{PLL}$ are iteratively compared pair-by-pair, as indicated by the slanted lines in FIG. 2B. When this happens, the output at each phase detector 208 will depend upon which chain's token first asserts at the given phase detector. This depends on which clock ($F_{OSC}$ or $F_{PLL}$) edge first reaches its flip-flop for that phase detector 208 stage. (The default state for the phase detector 208 outputs is High.) The PLL clock will normally initially be faster and thus cause its flip-flop to assert first, which causes the phase detector 208 for that stage to remain High. However, somewhere down the line after the auxiliary oscillator clock frequency once again has risen above the PLL frequency, and its accumulated phase leads the PLL's accumulated phase, it will cause one of its flip-flops to assert first, which then causes the associated phase detector 208 to go Low. This causes the NAND output to assert, which causes the R/S latch 212 to reset thereby resulting in the R/S latch output to once again control the multiplexer 108 to select the PLL 102 as the source for the clock generator output. This is indicated at FIG. 2B where the Swap signal once again goes Low.

Note that with this embodiment, the second (circular) phase detector 203 can track for up to four cycles because it has four phase detector 208 stages. Depending on particular design considerations, however, more or less stages could be implemented. In addition, it should be appreciated that the invention is not limited to the particular implementation for the second phase detector circuit. Depending on particular design considerations such as latency, tracking precision and the like, other suitable circuits for a selection control circuit 104 could be used. In the following section, an alternative embodiment is presented.

Figure 3B:
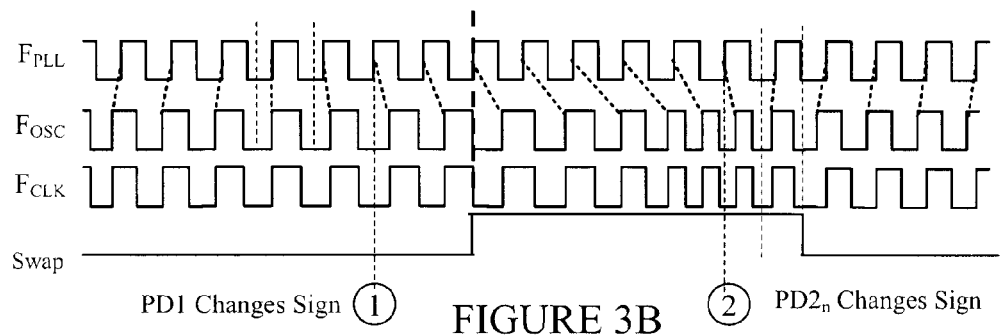
FIG. 3B is a timing diagram showing operation of the system of FIG. 3A according to some embodiments.

FIGS. 3A and 3B show a clock generator 300 according to some other embodiments. It is similar to clock generator 100 except that it comprises a different selection control circuit 304, a delay line 306 with greater delay (e.g., one full cycle) and a tapped off feedback (e.g., at ¾ cycle) to the selection control circuit 304, and a hybrid completion circuit 316 instead of a multiplexer. (FIG. 4 shows the hybrid completion circuit 316 according to some embodiments.)

The full cycle of delay in the delay line 306 provides greater delay flexibility (e.g. provides for a wider variety of delay lengths to tune in different frequency thresholds). The hybrid completion circuit allows for autonomous switching. That is, close-range (e.g., up to ¼ cycle) switching is performed by the completion circuit 316 automatically without having to wait for the selection control circuit 304. The completion circuit 316 passes the clock signal of either $F_{PLL}$ or $F_{OSC}$ arriving later in phase (i.e., the signal that lags the other). This "seamless" switching buys some time for the selection control circuit 304 to handle metastability. In the depicted embodiment, metastability immunity is enhanced in the selection control circuit 304 with the addition of two flip-flops in the first phase detector 302 and two more flip-flops 314 coupled between NAND gate 210 and, a ¾ tap at the delay line 306, and the R/S latch 212. With the use of the completion circuit 316, phase detection from the selection control circuit 304 is not necessary over a wider window of operation (e.g., until after 0.25 cycles of droop).

Figure 4:
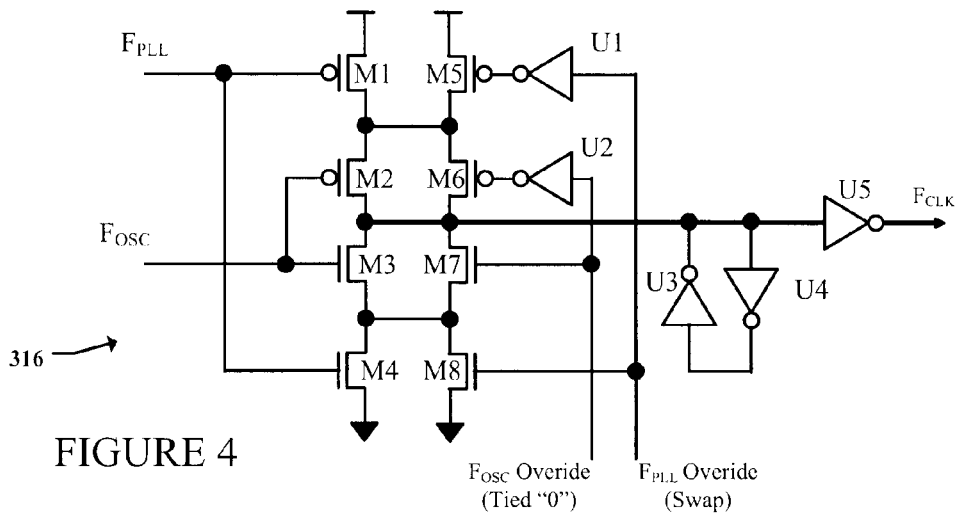
FIG. 4 is a schematic diagram of a completion circuit suitable for use in the system of FIG. 3A according to some embodiments.

FIG. 4 shows the hybrid completion circuit 316 of FIG. 3 according to some embodiments. It acts as a conventional C-element when the override signals ($F_{PLL}$ Override and $F_{OSC}$ Override) are inactive (Low). Turning on either override signal results in ignoring the corresponding input thereby transforming the circuit into an inverter for the other input signal. Thus, in the depicted embodiment, the $F_{OSC}$ Override input is tied Low, and the $F_{PLL}$ Override input is coupled to the Swap signal (at the output of the R/S latch 212).

In this way, under normal operation (when the supply is not drooping), the Swap signal is Low, which causes the hybrid completion circuit 316 to act as a conventional completion circuit. The last arriving clock edge (from $F_{OSC}$ and $F_{PLL}$) will couple through to the output. Thus, under normal conditions (with the delay line clock leading the PLL clock), the PLL will function as the clock source for the clock generator 300. On the other hand, during a droop event when the delay line clock lags the PLL clock, the completion circuit 316 effectively couples the delay line output instead of the PLL clock to the clock generator output. In the meantime, if the droop persists (e.g., after ¼ cycle), the first phase detector 302 detects the cross-over and causes the Swap signal to go High, which asserts the $F_{PLL}$ Override causing the delay line output to be coupled to the clock generator output by the time the phase difference may be out of range for the completion circuit 316. Thus, the auxiliary oscillator (coupled delay line) serves as the clock generator source for the duration of the droop event until the accumulated phase of $F_{OSC}$ crosses back to lead $F_{PLL}$, which causes Swap to go Low again, and the circuit to operate as previously described.

Figure 5:
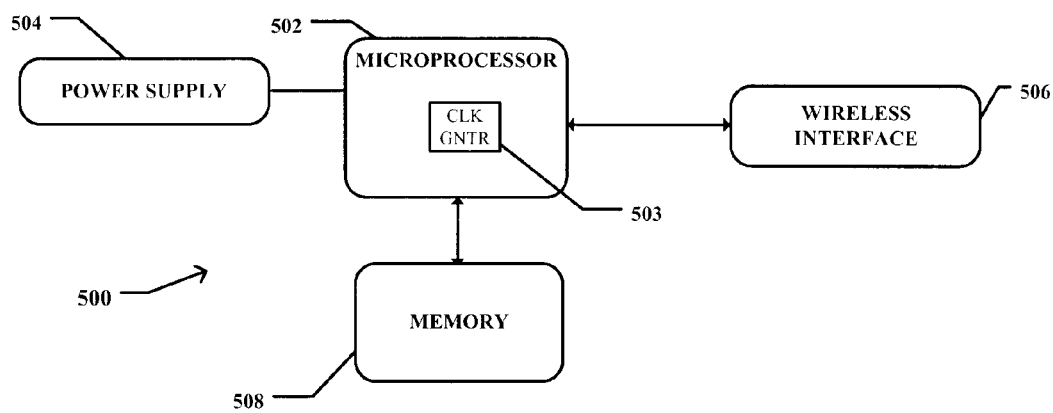
FIG. 5 is a block diagram of a computer system with a novel clock generator system according to some embodiments.

With reference to FIG. 5, one example of a computer system is shown. The depicted system generally comprises a processor 502 that is coupled to a power supply 504, a wireless interface 506, and memory 508. It is coupled to the power supply 504 to receive from it power when in operation. It is coupled to the wireless interface 506 and to the memory 508 with separate point-to-point links to communicate with the respective components. It also includes one or more clock generator circuits 503 configured in accordance with a novel clock generator circuit disclosed herein. For example, clock generator 503 could be coupled to provide a clock signal to a core within microprocessor 502. The wireless interface serves to communicatively link it with a wireless network such as through a wireless router.

It should be noted that the depicted system could be implemented in different forms. That is, it could be implemented in a single chip module, a circuit board, or a chassis having multiple circuit boards. Similarly, it could constitute one or more complete computers or alternatively, it could constitute a component useful within a computing system.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chip set components, programmable logic arrays (PLA), memory chips, network chips, and the like.

Moreover, it should be appreciated that example sizes/models/values/ranges may have been given, although the present invention is not limited to the same. As manufacturing techniques (e.g., photolithography) mature over time, it is expected that devices of smaller size could be manufactured. In addition, well known power/ground connections to IC chips and other components may or may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements are highly dependent upon the platform within which the present invention is to be implemented, i.e., such specifics should be well within purview of one skilled in the art. Where specific details (e.g., circuits) are set forth in order to describe example embodiments of the invention, it should be apparent to one skilled in the art that the invention can be practiced without, or with variation of, these specific details. The description is thus to be regarded as illustrative instead of limiting.

What is claimed is:

1. A chip, comprising:
 a clock generator comprising an output, a first clock source to provide a substantially stable first clock and a second clock source to provide a second clock whose frequency substantially tracks a supply, the clock generator to selectably provide at the clock generator output the first clock when the supply is sufficient and to selectably provide at its output the second clock when the supply is insufficient, the second clock being slower than the first clock when the supply is insufficient.

2. The chip of claim 1, in which the first clock source comprises a PLL circuit to provide the first clock.

3. The chip of claim 2, in which the clock generator comprises a multiplexer coupled to the PLL and second clock source to selectably provide at the clock generator output one of the first PLL clock and the second clock.

4. The chip of claim 3, in which the second clock source comprises a delay line coupled between the clock generator output and an input of the multiplexer to provide the second clock.

5. The chip of claim 4, in which the clock generator comprises a selection control circuit coupled to the PLL circuit, the delay line, and to the multiplexer to selectably control the multiplexer based on a phase difference between the first and second clocks.

6. The chip of claim 5, in which the selection control circuit comprises a first phase detector to detect when the second clock crosses below the first clock.

7. The chip of claim 6, in which the selection control circuit comprises a second phase detector to determine when the second clock crosses back above the first clock.

8. The chip of claim 7, in which the second phase detector comprises a circular phase detector with one or more phase detector stages.

9. The chip of claim 2, in which the clock generator comprises a completion circuit coupled to the PLL and second clock source to selectably provide at the clock generator output one of the first PLL clock and the second clock.

10. The chip of claim 9, in which the second clock source comprises a delay line coupled between the clock generator output and an input of the completion circuit to provide the second clock.

11. The chip of claim 10, in which the delay line comprises a tuneable delay line capable of providing one cycle of delay.

12. A microprocessor chip, comprising:
at least one core having a clock generator coupled to a clock distribution network to provide it with a generator clock, the clock generator comprising a first clock source to provide a first clock and a second clock source to provide a second clock whose frequency at least indirectly tracks a supply to the clock distribution network, the clock generator to selectably provide for the generator clock the first clock when the second clock leads the first clock and to selectably provide the second clock when it lags behind the first clock.

13. The microprocessor chip of claim 12, in which the first clock source comprises a PLL circuit to provide the first clock.

14. The microprocessor chip of claim 13, in which the clock generator comprises a multiplexer coupled to the PLL and second clock source to selectably provide for the generator clock one of the first PLL clock and the second clock.

15. The microprocessor chip of claim 14, in which the second clock source comprises a delay line coupled between the clock generator and an input of the multiplexer to provide the second clock.

16. The microprocessor chip of claim 15, in which the clock generator comprises a selection control circuit coupled to the PLL circuit, the delay line, and to the multiplexer to selectably control the multiplexer based on a phase difference between the first and second clocks.

17. The microprocessor chip of claim 16, in which the selection control circuit comprises a first phase detector to detect when the second clock lags the first clock.

18. The microprocessor chip of claim 17, in which the selection control circuit comprises a second phase detector to determine when the second clock crosses back above the first clock.

19. A system, comprising:
(a) a microprocessor comprising at least one core having a clock generator coupled to a clock distribution network to provide it with a generator clock, the clock generator comprising a first clock source to provide a first clock and a second clock source to provide a second clock whose frequency at least indirectly tracks a supply to the clock distribution network, the clock generator to selectably provide for the generator clock the first clock when the second clock leads the first clock and to selectably provide the second clock when it lags behind the first clock; and
(b) a wireless interface coupled to the microprocessor to communicatively link it with a wireless network.

20. The system of claim 19, in which the clock generator comprises a multiplexer coupled to the first and second clock sources to selectably provide for the generator clock one of the first and second clocks, the first clock generated by a PLL and the second clock being generated by a delay line.

* * * * *